United States Patent [19]

Marks

[11] Patent Number: 4,955,742

[45] Date of Patent: Sep. 11, 1990

[54] ERECTABLE STRUCTURE TRUSS ATTACHMENT JOINT

[75] Inventor: Geoff Marks, Santa Barbara, Calif.

[73] Assignee: Astro Aerospace Corp., Carpinteria, Calif.

[21] Appl. No.: 441,232

[22] Filed: Nov. 22, 1989

Related U.S. Application Data

[63] Continuation of Ser. No. 52,237, May 19, 1987, abandoned.

[51] Int. Cl.$^5$ .............................................. B15G 3/00
[52] U.S. Cl. .................................. 403/246; 403/261; 403/381
[58] Field of Search ............... 403/240, 246, 254, 255, 403/256, 257, 261, 264, 324, 49, 381, 353

[56] References Cited

U.S. PATENT DOCUMENTS

| | | |
|---|---|---|
| 559,911 | 5/1896 | Sheridan . |
| 3,434,748 | 3/1969 | Leurent . |
| 3,458,052 | 7/1969 | Kann . |
| 3,537,736 | 11/1970 | Kroopp . |
| 3,672,710 | 6/1972 | Kroopp . |
| 4,017,199 | 4/1977 | Strassle ............................... 403/264 |
| 4,637,193 | 1/1987 | Lange ............................... 403/381 X |

FOREIGN PATENT DOCUMENTS

| | | |
|---|---|---|
| 102519 | 4/1953 | France ................................ 403/353 |
| 426294 | 12/1965 | France . |
| 403207 | 6/1966 | Switzerland . |
| 197421 | 5/1923 | United Kingdom . |

Primary Examiner—Andrew V. Kundrat
Attorney, Agent, or Firm—Spensley Horn Jubas & Lubitz

[57] ABSTRACT

An erectable structure truss attachment joint includes a first truss having a casing containing a piston between a flange on the end of the casing and a wedge threadably mounted on an adjustment screw inside the casing. A tension rod passing through the wedge and the piston has a knob extending out of the casing on one end and an end bolt holding a leaf spring against the wedge on the other. A helical spring inside the casing creates pressure between the piston and the tension rod. A second truss has a notched retention wall at one end forming a chamber. The knob of the tension rod is inserted into the chamber to attach the two trusses. When the adjustment screw is tightened, the wedge acts against angled faces of the leaf spring on one side and the piston on the other side to create pressure against the piston and the leaf spring. The leaf spring exerts pressure against the end bolt to pull the tension rod into the interior of the casing. The piston and the knob therefore exert compressive pressure against opposite sides of the retention wall to hold the knob inside the chamber and thereby join the two trusses. The joint may be tightened by an external tool or by a double-action actuator attached to the wall of the casing.

42 Claims, 8 Drawing Sheets

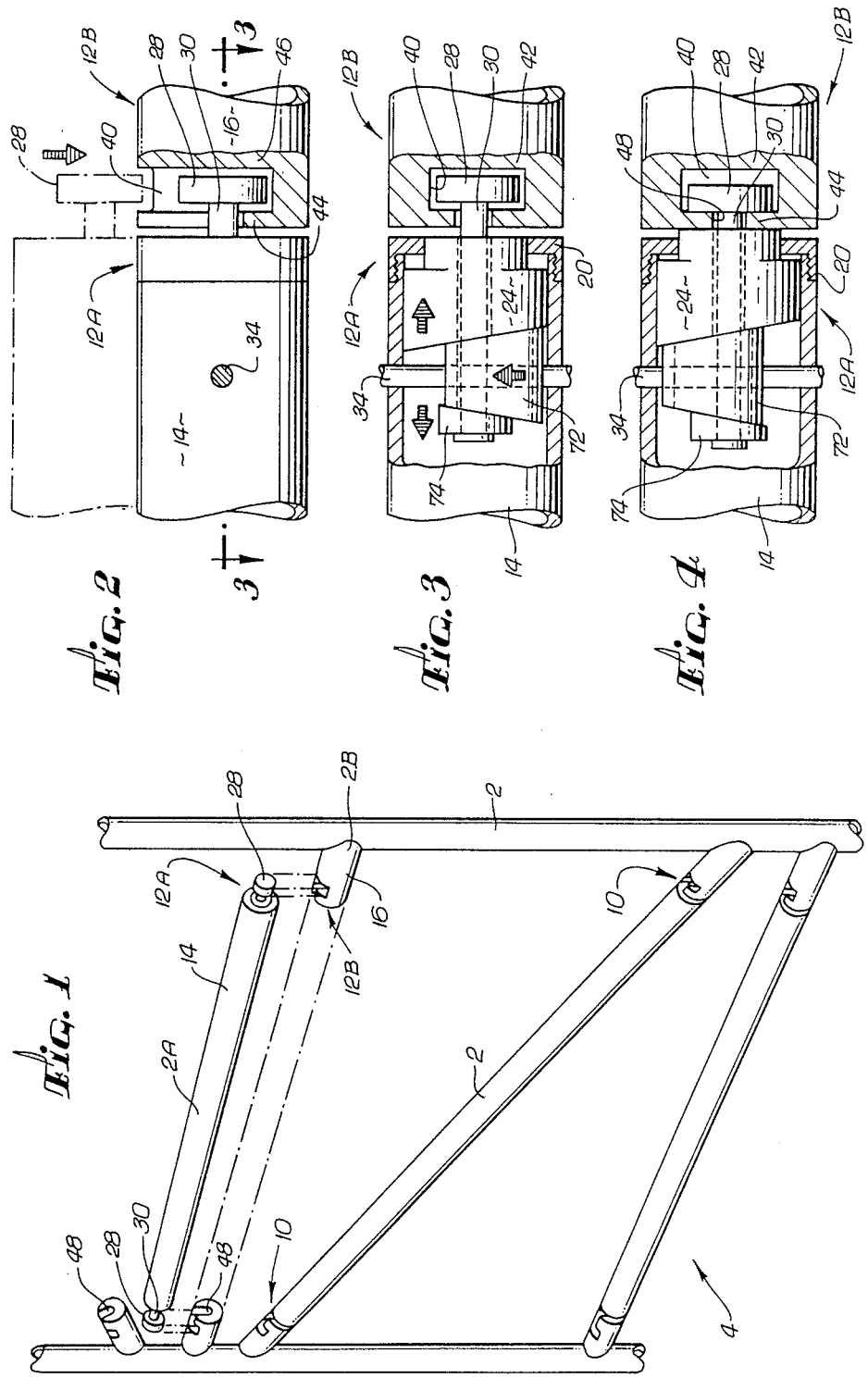

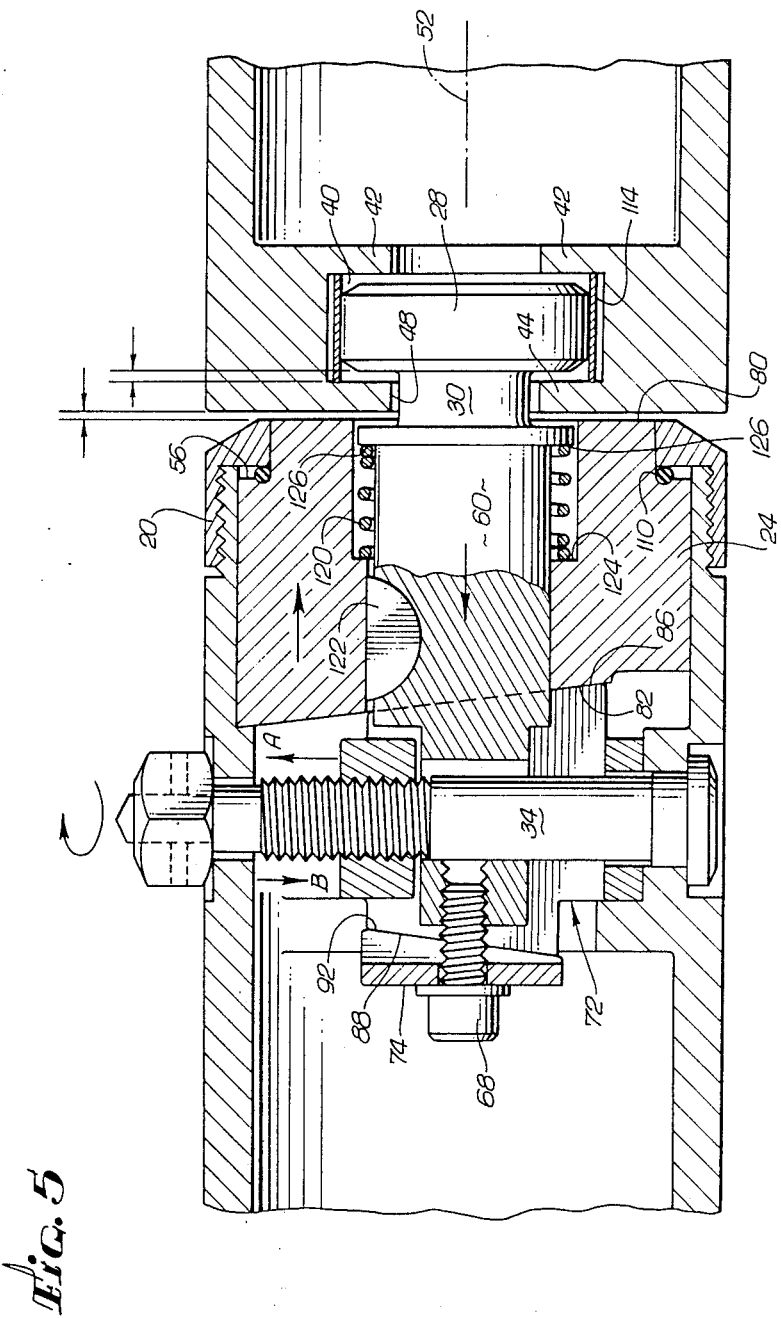

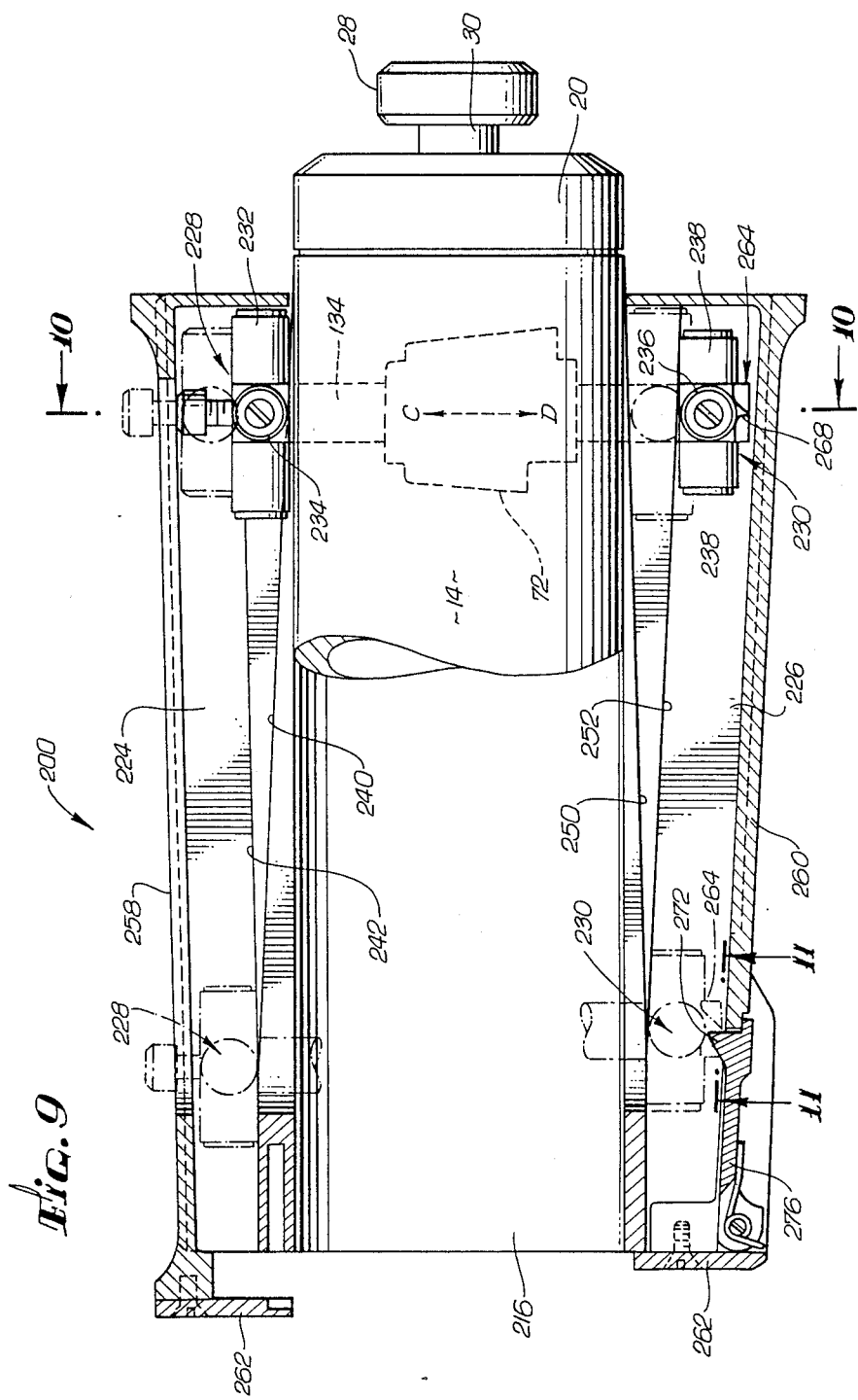

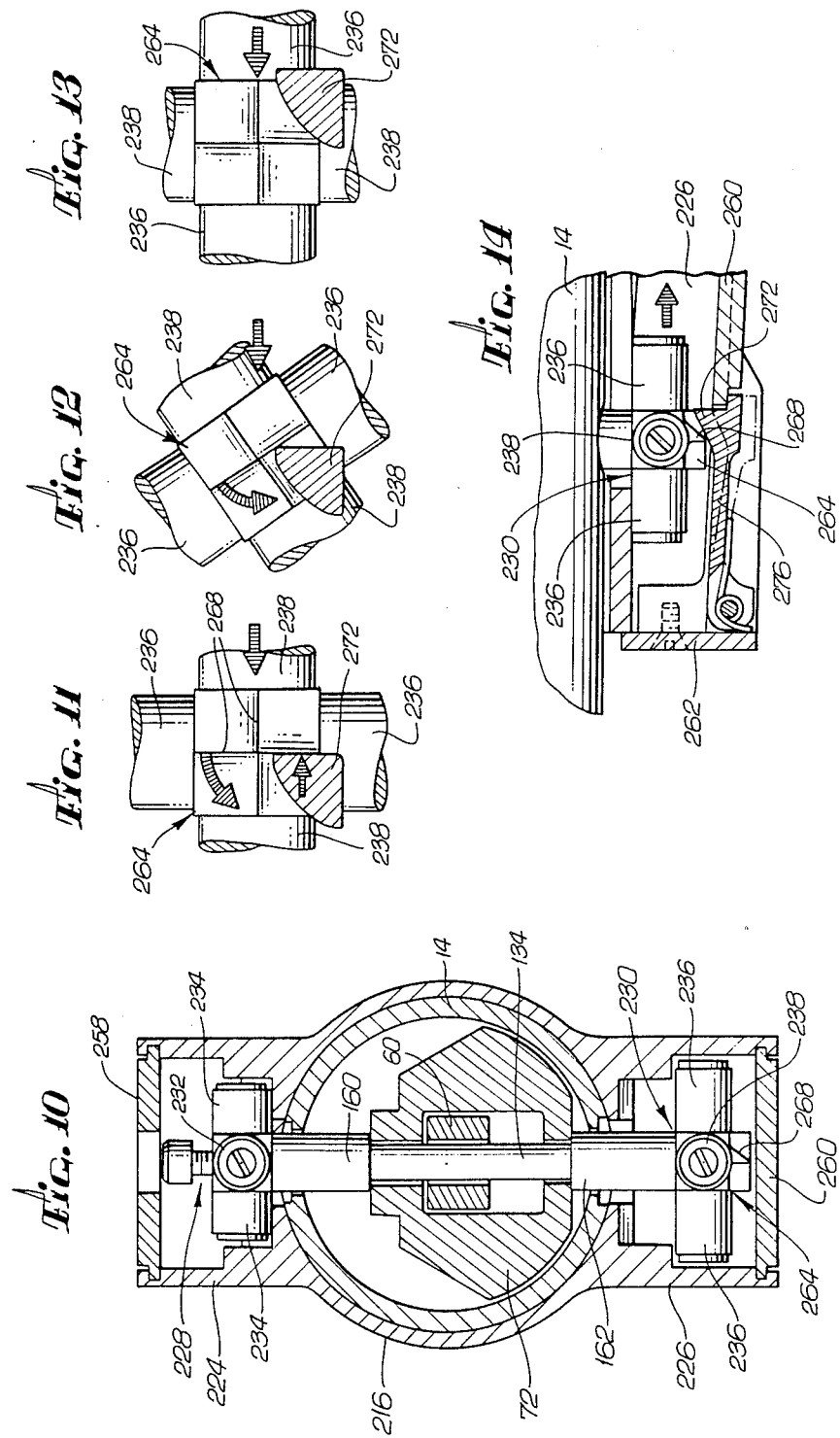

ERECTABLE STRUCTURE TRUSS ATTACHMENT JOINT

This is a continuation of application Ser. No. 052,237, filed on May 19, 1987, now abandoned.

TECHNICAL FIELD

This invention relates to truss attachment joints for erectable tubular truss structures utilized in space construction.

BACKGROUND

Assemblying structures in outer space has a number of associated problems. For instance, when joining structural truss members, the joint should allow insertion of a truss member into an existing precision structure. Distortions of more than a few thousandths of an inch are to be avoided.

The joint should also be sufficiently strong to minimize compliance due to compression of the joint over a large load range. The ability to operate at a variety of temperatures without losing the "preload" as a result of thermal expansion or contraction is also highly desirable. The "preload" is the compressive or tension force applied to a particular part or parts that must be overcome to move the part or to reduce the structural stability of the part. If the joint is unable to maintain its preload, the joint may fail.

Numerous attempts have been made to develop a simple, effective joint but many have had significant drawbacks. For instance, in one prior joint, the ends of the trusses have been provided with grooves for mating engagement with parts of a split lock ring. With the split lock ring placed in the grooves, a sleeve having an angled inner edge is screwed over the split lock ring. The angled edges cause the split lock ring to lock down tightly over the two interlocking ends of the trusses. An alternate design uses a lever and camming surfaces to tighten the joint. While some of these designs permit at least limited rotational alignment, this coupling method is very complicated. In addition, the separate parts such as the split lock ring typically are not attached to either of the trusses prior to assembly and therefore may easily be misplaced or lost. The joints also often have numerous angled exterior edges that may snag on equipment or space suits.

In another prior joint, the ends of the trusses have semi-circular grooves and wedges that form interlocking surfaces and prevent longitudinal displacement of either truss. A spring-loaded pivoting latch inside the joint prevents radial displacement to hold the ends together. While the joints are self-contained, the truss ends also tend to be complex, have several edges for potential snagging, and generally can only be attached in one specific rotational alignment. As a result, the astronaut connecting the joint usually must properly align the truss prior to connecting the joint or the joint cannot be connected.

Yet another prior joint uses a bayonet mount similar to those used for camera lenses. The end of one truss has flanges that are placed over the end of the other truss. A chuck key is used to tighten the flanges against ribs on the exterior wall of the second truss. However, the chuck key and the exterior edges considerably increase the risk of snagging and insertion of the truss usually temporarily distorts the existing structure. Also, the final rotational alignment is restricted to one of the rotational positions afforded by the position of the flanges. While the joint could be designed having several alignment positions, that design would likely require an equal number of flanges and ribs around the truss ends which could complicate and weaken the joint construction.

Finally, a joint having a ball-and-socket construction much like those of an automobile trailer can provide rotational alignment. However, the joint typically has reduced coupling strength and is subject to increased wear because of movement of the ball in the socket due to rotational, compressive, and expansive forces. The joint may also distort the existing structure when inserted and there is significant potential for snagging.

To minimize crew member fatigue, the joint should be easy to assemble. A temporary snap-action attachment prior to final tightening is very desirable to allow the astronaut to attach the two truss members without concern for alignment and thereafter the astronaut may align the two halves of the joint and create a solid structural attachment of the two trusses without undue force. Unfortunately, prior joints have not met all these objectives.

SUMMARY

The present invention provides an erectable structure attachment joint which alleviates these and other problems of prior devices. A joint in accordance with the present invention allows a truss to be inserted into an existing structure with little, if any, distortion of the structure. Because the joint provides a means of temporary attachment, the joint may be coupled, the truss aligned, and then the joint tightened without disturbing that alignment. A preload applied to the various parts of the joint is sufficient for most, if not all, purposes and is not substantially affected by thermal expansion. The preload on the joint is also sufficient to obtain a structural load path through the joint that is essentially a continuation of the load path passing through the truss, and so the joint is able to withstand significant compressive forces. The joint according to certain aspects of the present invention provides a smooth, basically symmetrical external profile with little potential for snagging before or after joining.

In accordance with the illustrated embodiment of the present invention, a piston is held in a casing at one end of a first truss and a knob is connected on the end of a tension rod passing through the piston so that the knob is held out of the casing and slightly away from the end of the piston. A second truss has a chamber at one end formed by a notched retaining wall. The knob is inserted into the chamber to attach the two trusses and the retention wall is thereby placed between the knob and the piston with the tension rod in the notch.

The joint may be tightened by an external tool or by an actuator mounted about the joint if it is desirable to erect the structure without the use of tools. When the joint is tightened, a wedge inside the casing pushes against angled faces of the piston on one side and a leaf spring on the other side to create pressure against the piston and the leaf spring. The piston exerts pressure against the outside of the retention wall. The leaf spring pulls the tension rod toward the interior of the casing. This causes the knob to exert pressure against the inside of the retention wall. The compressive pressure of piston and the knob against the retention wall on the end of the second truss holds the two trusses together without significant risk of failure because of wear or loss of preload.

BRIEF DESCRIPTION OF THE DRAWINGS

The invention may be better understood by reference to the following Detailed Description in conjunction with the attached Drawings wherein:

FIG. 1 is a perspective view of a space station latticework utilizing an erectable structure attachment joint according to one embodiment of the present invention;

FIG. 2 is a side view of the erectable structure attachment joint of FIG. 1 showing the method of coupling the joint;

FIGS. 3 and 4 are diagramatic sectional views showing the manner of tightening the joint of FIG. 1;

FIG. 5 is a cross-sectional view of one embodiment of the joint of FIG. 1;

FIG. 9 is a sectional view of the sliding actuator of FIG. 8;

FIG. 10 is a sectional view of the sliding actuator taken along the line 10—10 of FIG. 9;

FIGS. 11-13 are top sectional views taken along the line 11—11 of FIG. 9 showing an indexing gear used in the actuator of FIG. 8;

FIG. 14 is a side sectional view of the indexing gear of FIGS. 11-13; and

DETAILED DESCRIPTION OF THE INVENTION

Figure 6:
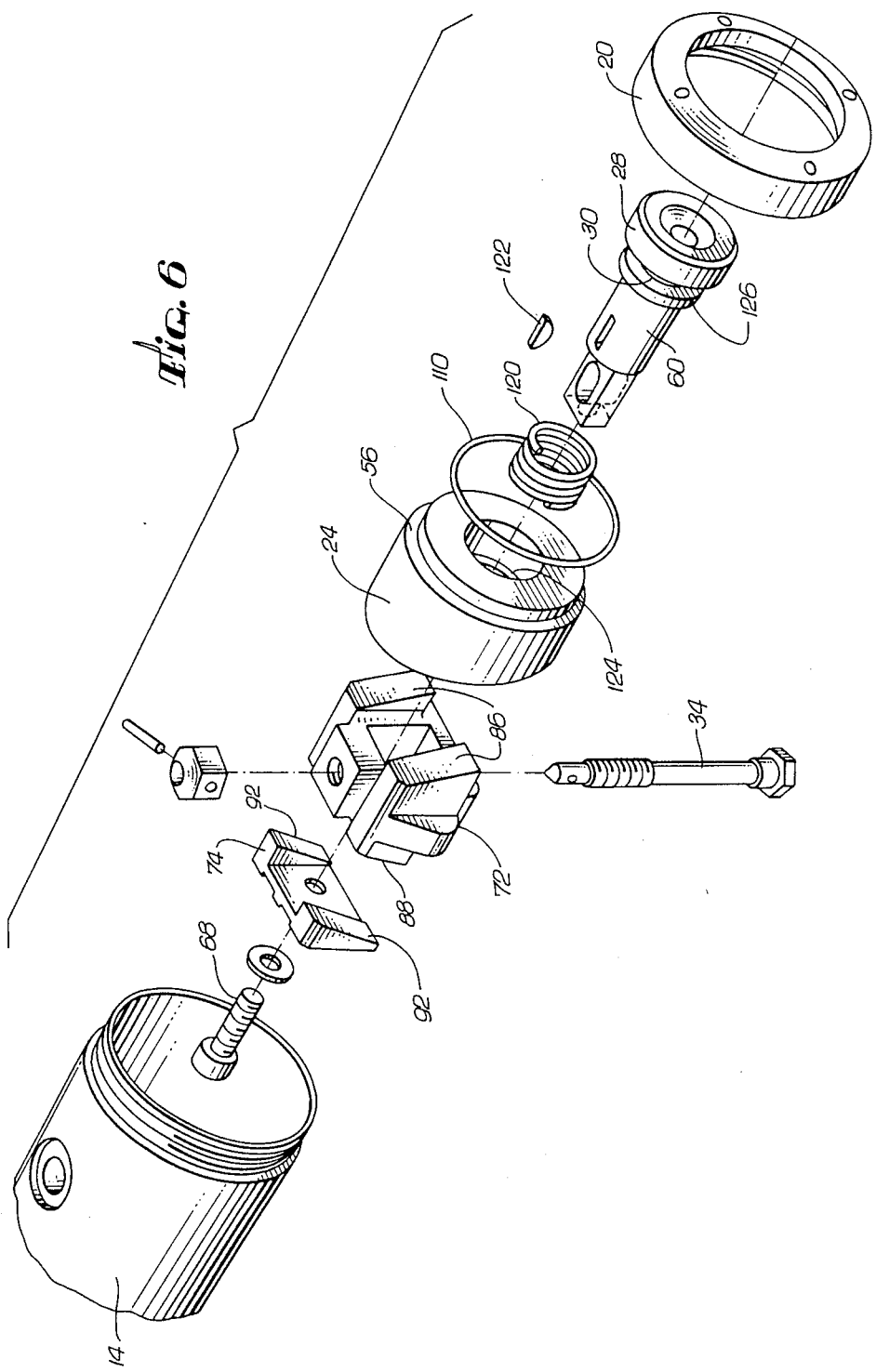
FIG. 6 is an exploded view of the joint of FIG. 1 showing a perspective view of the various parts of the joint.

Referring now to the drawings and specifically to FIG. 1 thereof, a perspective view of a latticework which may be used in the construction of a space station is shown. The latticework comprises numerous trusses 2 that interconnect to form a support structure 4. According to the invention, the trusses 2 are connected by a novel erectable structure truss attachment joint 10. As shown in FIG. 1, in constructing the latticework, it is often necessary for the trusses 2 to be inserted into the structure 4 without distorting the existing latticework.

The joint 10 comprises two parts, a first part 12A assembled in an attachment casing 14 on the end of an attaching truss 2A and a second part 12B formed in a receiving casing 16 on the end of a receiving truss 2B. The two parts 12A and 12B of the joint 10 are connected as discussed below to join the two trusses 2A and 2B.

Referring to FIG. 3, in the first part 12A of the joint 10, a toroidal flange 20 is threadably attached to the end of the attachment casing 14. The outer diameter of the flange 20 is approximately equal to the diameter of the truss 2A. The flange 20 extends into the casing 14 and holds a piston 24 inside the casing 14. The piston 24 has a generally cylindrical shape and is used to "lock" parts 12A and 12B together as discussed in more detail below.

FIG. 2 depicts the attachment of the joint 10 constructed according to one embodiment of the present invention. A generally cylindrical knob 28 that is to be received by the part 12B is held offset from the end of the piston 24 on the end of a neck 30 that extends out of the casing 14 through the center of the piston 24. One end of an adjustment screw 34 is shown flush with the cylindrical wall of the casing 14 and is more fully discussed below.

In the second part 12B of the joint 10, a chamber 40 for receiving the knob 28 is formed between an interior wall 42 and a retention wall 44 in the end of the receiving casing 16. A notch 48 cut down the radius of the retention wall 44 as shown in FIG. 1 allows communication through the retention wall 44 into the chamber 40.

As shown in FIG. 2, to couple the two parts of the joint 10, the knob 28 is inserted into the chamber 40 and the neck 30 slides into the notch 48. The chamber 40 is large enough to hold the knob 28. The width of the notch 48 is slightly greater than the diameter of the neck 30 so that the neck 30 can slide into the notch 48 when the knob 28 is inserted into the chamber 40. Because the diameter of the knob 28 is greater than the width of the notch 48, the retention wall 44 holds the knob 28 in the chamber 40. The depth of the notch 48 allows the neck 30 to go entirely into the notch 48 and effect proper alignment. When the two parts 12A and 12B of the joint 10 are properly coupled, the casings 14 and 16, trusses 2A and 2B, flange 20, neck 30, knob 28 and piston 24 share a common central axis 52 (see FIG. 5).

After the joint is coupled, the adjustment screw 34 is tightened by a tool, such as an Allen wrench, to tighten the joint 10 as will be more fully discussed below. Suffice it to say at this point that tightening the adjustment screw 34 causes the piston 24 to exert pressure against the outside of the retention wall 44 and also causes the knob 28 to exert pressure against the inside of the retention wall 44. The opposing pressures exerted on the retention wall 44 hold the parts 12A and 12B of the joint 10 together.

The different positions of the piston 24 and knob 28 can be seen by comparing FIGS. 3 and 4. FIG. 3 shows the joint 10 in a coupled, untightened condition and FIG. 4 shows the joint 10 in a tightened condition. Tightening the adjustment screw 34 does not change the combined length of the trusses 2A and 2B more than a few thousands of an inch because movement of the piston 24 and knob 28 along the central axis 52 is very short and does not substantially change the relative positions of the casings 14 and 16. By properly designing the clearance between the piston 24 and knob 28 and the thickness of the retention wall 44, the travel of the piston 24 and knob 28 may be extremely short, if desired.

Referring now to FIG. 5, a cross-sectional view of the joint 10 according to one embodiment of the present invention is shown. The cross-sectional view of FIG. 5 depicts the parts 12A and 12B of the joint 10 in a connected fashion but prior to tightening the adjustment screw 34.

As shown in FIG. 5, the inside portion of the flange 20 cooperates with an outside shoulder 56 of the piston 24 to hold the piston 24 inside the casing 14. The knob 28 and neck 30 form one end of a tension rod 60 that extends through a passage down the central axis 52 of the piston 24. The central axis 52 is also the central axis of the tension rod 60.

The other end of the tension rod 60 is threadably attached to an end bolt 68. The tension rod 60 also extends through passages in a wedge 72 and a leaf spring 74. The end bolt 68 and flange 20 hold the piston 24, wedge 72 and leaf spring 74 together inside the casing 14 and around the tension rod 60.

The piston 24 has a generally cylindrical shape with a first, joint abutting end 80 perpendicular to the central axis 52 and a second, angled end 82 forming a bearing surface at an angle to the central axis 52. The second end 82 abuts against a first angled face 86 formed on one side of the wedge 72 at an angle to the central axis 52 that is complementary to the angle of the second end 82 of the piston 24. At least part of the opposite side of the wedge 72 forms a second angled face 88 that abuts against, and is formed at an angle complementary to, a bearing surface 92 on the leaf spring 74. The bearing surfaces are lubricated to provide smooth movement of parts.

The attachment screw 34 extends through the casing 14 and through bores in the wedge 72 and the tension rod 60. The attachment screw 34 is threadably attached to the wedge 72 so that rotation of the screw 34 one way or the other causes the wedge 72 to move up or down in the direction of the arrows A and B.

When the screw 34 is tightened, the wedge 72 moves upward in the direction shown in arrow A of FIG. 5. Because of the angled bearing surfaces of the wedge 72 and piston 24, movement of the wedge 72 creates pressure against the piston 24 as schematically depicted in FIG. 3. The wedge 72 therefore pushes the piston 24 along the central axis 52 a very short distance toward the retention wall 44 of the part 12B. The piston 24 compresses a circular O-ring 110 held between the outside shoulder 56 of the piston 24 and the flange 20 and the first end 80 of the piston 24 pushes against the outside of the retention wall 44.

Movement of the wedge 72 also pushes the leaf spring 74 and the end bolt 68 further into the casing 14. The end bolt 68 pulls the tension rod 60 and thereby causes the knob 28 to exert pressure against the inside of the retention wall 44. The opposing pressures of the piston 24 and knob 28 against both sides of the retention wall 44 hold the two sides 12A and 12B of the joint 10 together.

Preferably, the angle between the central axis 52 of the casing 14 and the first angled face 86 of the wedge 72 is greater than the angle between the central axis 52 and the second face 88 so that the pressure on the leaf spring 74 as a result of movement of the wedge 72 causes greater relative travel of the tension rod 60 than of the piston 24. The angled bearing surfaces are preferably designed to provide a preload on the tension rod 60 when the joint 10 is tightened sufficient to counteract the expected compression load in the assembled space structure. The threaded engagement between the adjustment screw 34 and wedge 72 is preferably torqued so that the wedge 72 applies a preload between the piston 24 and the flange 20 sufficient to withstand the expected compression load in the structure. The preload may be controlled by the design of the angled bearing surfaces on the piston 24, wedge 72 and leaf spring 74 and by the dimensions of the straight abutting surfaces.

The astronaut need not align the trusses 2A or 2B before engagement because the knob 28 and the casings 14 and 16 are all symmetrical. The assembling astronaut may insert the knob 28 into the chamber 40, rotate the casings 14 and 16 to the desired alignment, and then tighten the joint to retain that alignment. Thus, alignment to any convenient rotation to tighten the joint 10 or to position the trusses 2A or 2B may be done after the joint 10 is temporarily coupled. Once the joint 10 is tightened, rotation is prevented because of the pressure exerted by the knob 28 and piston 24 against the retention wall 44.

According to one aspect of the present invention, the joint 10 is designed to withstand modest stresses when the two parts 12A and 12B are connected but before the joint 10 is tightened. As shown in FIG. 5, a tension spring 114 inside the chamber 40 fits around the knob 28 to hold the knob 28 inside the chamber 40 against modest stresses. The tension spring 114 allows a snap-action engagement well within crew member capability. Thus, when the joint 10 is initially connected, the tension spring 114 holds the knob 28 inside the chamber 40 and is able to withstand modest stresses while permitting rotation of the attaching casing 14 and receiving casing 16 to allow proper rotational alignment of the trusses 2A and 2B prior to tightening.

As also shown in FIG. 5, a helical spring 120 is inserted around the tension rod 60. The helical spring 120 exerts pressure against an inside shoulder 124 of the piston 36 and against the base 126 of the neck 30 of the knob 28 and thereby maintains a limited amount of expansive tension between the piston 24 and tension rod 60. This expansive tension is used as discussed below to uncouple the joint 10.

To release the joint 10, the adjustment screw 34 is rotated in the opposite direction to drive the wedge 72 in the direction of the arrow B and relieve the pressure on the piston 24. The helical spring 120 pushes the tension rod 60 forward (i.e., toward the part 12B) and the compressed O-ring 110 and the helical spring 120 push the piston 24 back (i.e., into the casing 14) to achieve the necessary clearance for disengagement. With the load removed, the knob 28 is retained in the chamber 40 by the tension spring 114.

FIG. 6 depicts an exploded perspective view of the various parts of part 12A of the joint 10 of FIGURE 5. As shown in FIG. 6, an alignment key 122 is inserted into the tension rod 60 to properly align the rod 60 during assembly of the joint 10. The piston 24 is essentially cylindrical in shape but, of course, has the outside shoulder 56, inside shoulder 124, and the angled second end 82. The wedge 72 contains an oblong passage that permits the tension rod 60 to pass through the wedge 72 and a threaded bore for receiving the adjustment screw 34. The leaf spring 74 is basically rectangular except for the angled bearing surface 92 and the passage for the tension rod 60 and end bolt 68. Of course, other shapes and configurations may be used.

Figure 7:
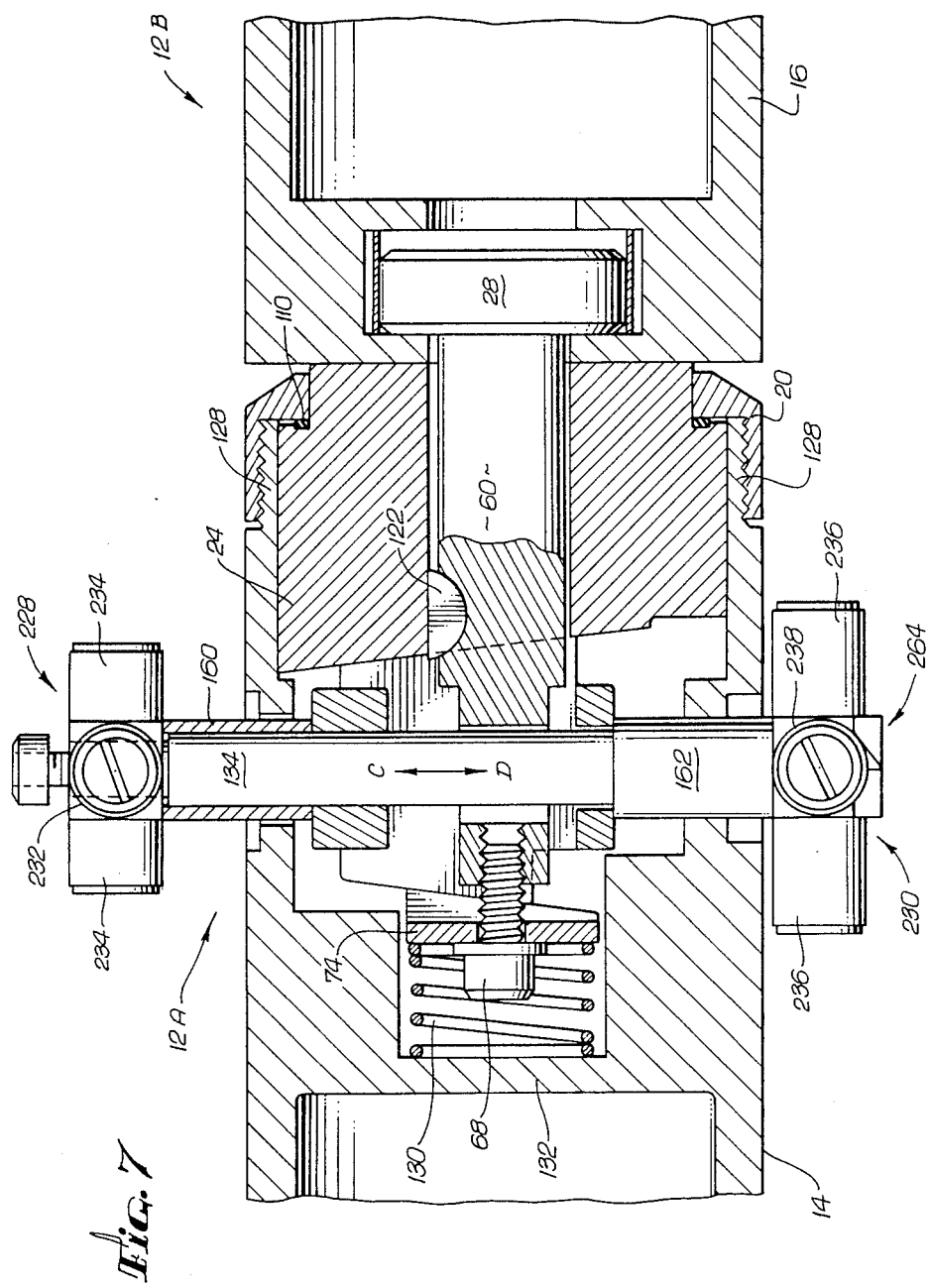
FIG. 7 is a cross-sectional view of an alternate embodiment of an erectable structure attachment joint according to the present invention.

Referring now to FIG. 7, a cross-sectional view of the joint 10 according to another embodiment of the invention is shown. Because many of the various parts are the same or similar to the parts shown in FIGS. 5 and 6, the same reference numbers are used for the corresponding parts. FIG. 7 depicts the joint in a tightened condition, wherein the wedge 72 is shifted upwards in FIG. 7 to exert pressure against leaf spring 74 and piston 24 and thereby tighten the joint. Comparison of FIGS. 5 and 7 shows the difference between the tightened and untightened condition of the joint 10 and further shows that tightening the joint 10 does not substantially affect the length of the truss because the relative positions of casings 14 and 16 do not substantially change. Only the elements of the joint 10 assembled inside the casing 14 move any substantial distance.

As shown in FIG. 7, the structural load path 128 of the joint 10 passes from the casing 14 to the flange 20 to the outside shoulder 56 to the piston 24 and thence to the retention wall 44 of the casing 16. The load path 128 is through simple butt joints. The structural load path 128 passes through the perimeter of the joint 10, and thus continues the load path of the trusses 2A and 2B. The tension rod 60 is merely a preloading spring and is out of the load path.

According to the embodiment of the invention shown in FIG. 7, a helical spring 130 is placed between the end bolt 68 and an interior wall 132 of the casing 14. The helical spring 130 performs the same function as the helical spring 120 shown in FIG. 5 by causing expansive pressure between the wall 132 and the end bolt 68 and tension rod 60 to assist in releasing the joint 10.

The embodiment of the invention shown in FIG. 7 also includes a tightening bolt 134 in place of the adjustment screw 34 shown in FIGS. 2 and 5. According to the embodiment of the invention shown in FIG. 7, rather than threadably attaching the tightening bolt 134 to the wedge 72, a cylindrical sleeve 160 around the bolt 134 abuts the top of the wedge 72 and a cylindrical sleeve 162 around the bolt 134 abuts the bottom of the wedge 72. When the tightening bolt 134 is moved in the direction of arrow C of FIG. 7, the sleeve 162 exerts pressure against the wedge 72 and forces the wedge 72 to move in the direction of the arrow C and thereby tighten the joint 10. When the tightening bolt 134 is moved in the direction of arrow D, the sleeve 160 forces the wedge 72 down to loosen the joint 10.

In another aspect of the present invention, the tightening bolt 134 with the sleeves 160 and 162 may be used in cooperation with a hand-operated sliding actuator 200 depicted in FIGS. 8–14. As will be more fully explained below, the actuator 200 causes the tightening bolt 134 to move in the directions of the arrows C and D of FIG. 7. When the bolt 134 moves, the sleeves 160 and 162 move the wedge 72 to tighten or loosen the joint 10 as described above.

Figure 8:
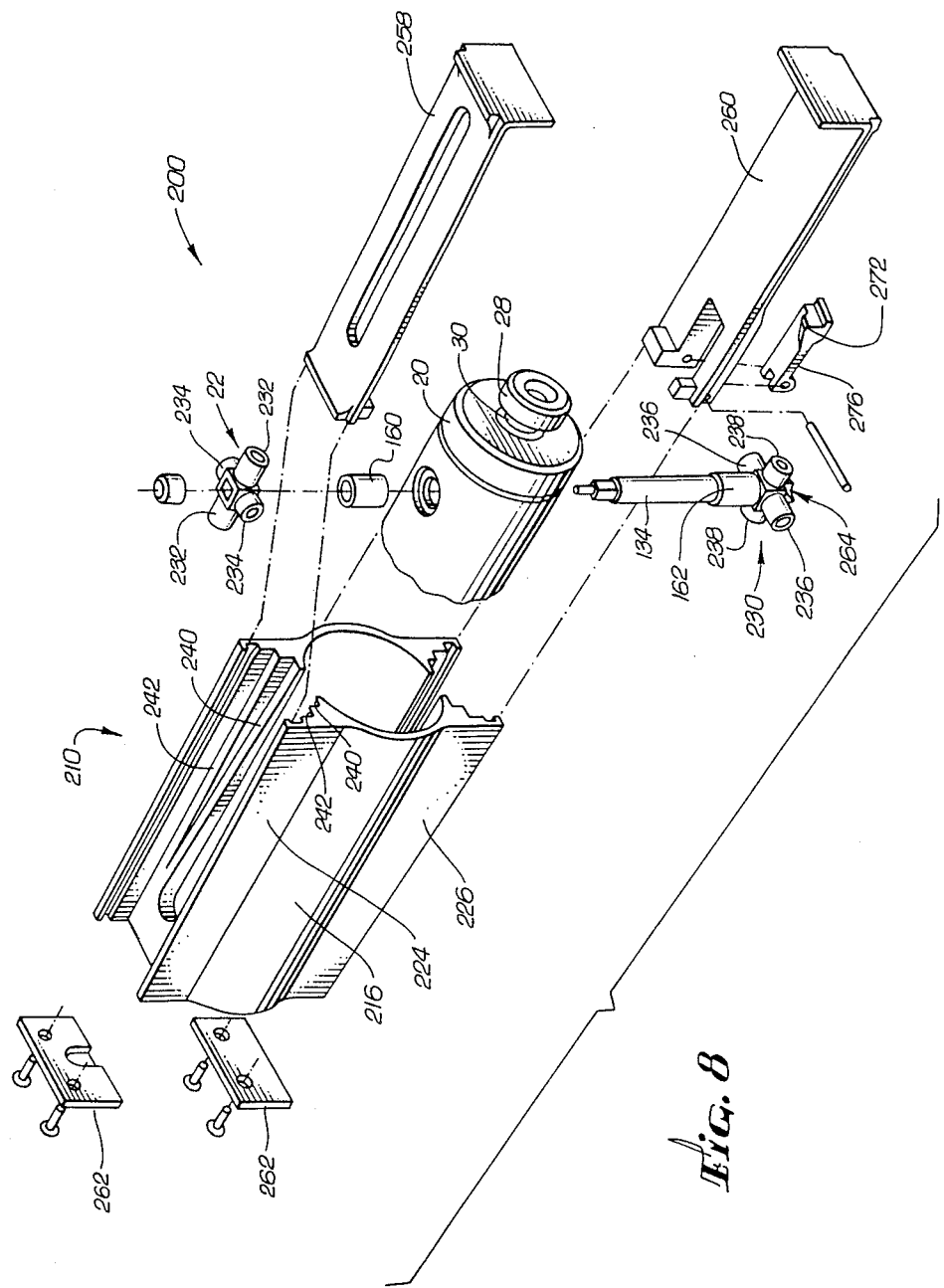
FIG. 8 is an exploded perspective view of a sliding actuator for tightening the joint of FIG. 7.

As shown in FIGS. 8 and 9, the actuator 200 comprises a sleeve 210 mounted around the casing 14. The sleeve 210 has a cylindrical center portion 216 supporting two incline-containing appendages 224 and 226.

To enable use of the actuator 200, double cams 228 and 230 are fixed inside the appendages 224 and 226, respectively, on the ends of the tightening bolt 134. Long rollers 232 and short rollers 234 are fixed on the first cam 228. Long rollers 236 and short rollers 238 are fixed on the other cam 230. The axis of rotation of the long rollers 232 is perpendicular to the axis of rotation of the short rollers 234. The axis of rotation of the long rollers 236 is perpendicular to the axis of rotation of the short rollers 238.

The appendage 224 has a pair of inner ramps 240 and a pair of outer ramps 242 formed therein. The appendage 226 also has a pair of inner ramps 250 and outer ramps 252 formed therein. The rollers 232, 234, 236 and 238 act against the ramps 240, 242, 250 and 252 as discussed below to move the tightening bolt 134, and thus the wedge 72, and thereby tighten (or loosen) the joint 10.

The upper edges of the side walls of appendage 226 are inclined to be parallel to the outer ramp 252. A cover plate 258 covers the appendage 224 and a cover plate 260 covers the appendage 226. Two end plates 262 hold the cover plates 258 and 260 on the appendages 224 and 226.

An indexing gear 264 having four inclined teeth 268 separated by 90° is on the end of the second cam 230. As shown in FIGS. 11-13, the teeth 268 on the indexing gear 264 interact with a tooth 272 on the end of a hinged finger 276 mounted in the plate 260 to cause 90° indexing of the cams 228 and 230 when one of the teeth 268 on the gear 264 strikes the tooth 272. The indexing sequence includes a tooth 268 striking the tooth 272 (FIG. 11), the gear 264 turning (FIG. 12), and the completion of the 90° indexing (FIG. 13). FIG. 14 depicts the curvature on the back side of the teeth 268 that permits the hinged finger 276 to pivot to permit the tooth 268 to pass by the tooth 272 after indexing. FIG. 14 is basically a side view of the position shown in FIG. 13.

When the sleeve 210 is slid along the casing 14 in the direction of the knob 28 shown in FIG. 9, the short rollers 234 roll up the inner ramp 240 and the long rollers 236 roll down the outer ramp 252. At the end of that travel, one of the teeth 268 on the indexing gear 264 strikes the tooth 272 which causes the double cams 228 and 230 to index 90° and brings the rollers 232 and 238 in contact with the ramps 242 and 250, respectively. This position is shown in phantom lines in FIG. 9. The sleeve 210 is then slid in the opposite direction (i.e., away from the knob 28), the rollers 232 move up the outer ramp 242 and the rollers 238 move down the inner ramp 250. This position is also shown in phantom lines in FIG. 9.

The movement of the rollers 234 and 232 up the ramps 240 and 242, respectively, and of the rollers 236 and 238 down the ramps 252 and 250, respectively, draws the tightening bolt 134 upward in the direction of arrow C of FIGS. 7 and 9. The sleeve 162 exerts pressure against and therefore moves the wedge 72 to tighten the joint 10 as discussed above. Thus, sliding the sleeve 210 over and back completely tightens the joint 10. When the reverse action is employed, the bolt 134 moves downward and the sleeve 160 moves the wedge 72 in the direction of the arrow D of FIGS. 7 and 9 and loosens the joint 10.

The ramps 240 and 252 are large-angle ramps that provide large travel with little load for lifting the wedge 72 on the opening action of the actuator 200. The ramps 242 and 250 are small-angle ramps to insure a large mechanical advantage during the closing action of the actuator 200 to pull the wedge 72 upward through the shorter but highly loaded part of the travel to insure the preload on the wedge 72 and thus the preload between the piston 24 and flange 20.

Figure 15:
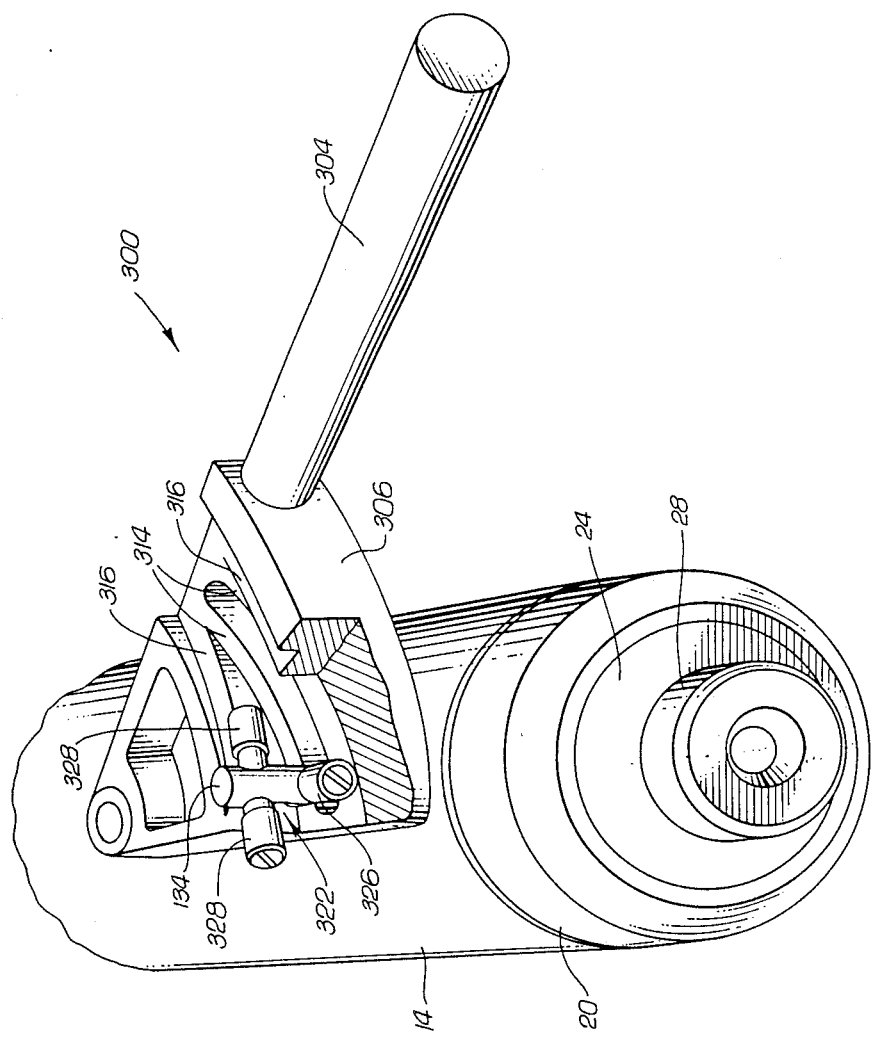
FIG. 15 is a perspective view of a pivoting actuator for tightening the joint of FIG. 7.

FIG. 15 depicts a hand-operated pivoting actuator 300 that operates in a manner similar to that of the actuator 200 to tighten the tightening bolt 134 in accordance with another embodiment of the invention. The actuator 300 comprises a torquing arm 304 attached to a lever base 306. The lever base 306 has an pair of lower ramps 314 and a pair of upper ramps 316 formed therein. Affixed to one end of the tightening bolt 134 is a double cam 322 having lower inner rollers 326 and upper outer rollers 328 mounted thereon. The double cam 322 is shown resting on the ramp 314. When the torquing arm 304 is pivoted, the rollers 326 roll up the ramp 314. At the end of that travel, the cam 322 indexes 90° to cause the rollers 328 to be in contact with the ramps 316. The torquing arm 304 is then pivoted in the opposite direction to pull the tightening bolt 134 through the remainder of its travel and thereby tighten the joint 10. To release the lever 300 and thus the tightening bolt 134, the reverse action is employed.

The lower ramps 314 are large-angle ramps to provide large travel with little load in lifting the wedge 72 on the opening action of the lever 300. The upper ramps 316 are small-angle ramps to insure a large mechanical advantage during the closing action of the lever 300 to pull the tightening bolt 134 and wedge 72 upwards through the shorter but highly loaded part of the travel. The double cam 322 may be designed with rollers 326 and 328 in the same plane rather than in separate planes, as discussed above with respect to the cams 228 and 230 of FIGS. 8-14.

While the invention has been described according to the embodiments shown in FIGS. 1-9, it will be apparent that the invention is capable of numerous modifications, rearrangements, and substitution of parts without departing from the spirit or scope of the invention.

I claim:

1. A joint for joining first and second members together, comprising:
   a wall carried by the first member, said wall defining first and second opposing faces;
   a knob carried by the second member and adapted to engage one face of the first member wall;
   a piston slideably carried by the second member and having a shoulder and a wall-abutting face adapted to engage the opposite face of the first member wall;
   a flange mounted on the second member and having a shoulder abutting face;
   means for actuating the knob and piston so that the wall of the first member is compressively held between the knob and piston; and
   means for establishing a preload between the wall-abutting face of the piston and the wall carried by the first member and between the shoulder of the piston and the shoulder-abutting face of the flange.

2. The joint of claim 1 wherein the wall in the first member comprises a means forming a chamber for engagingly receiving the knob.

3. The joint of claim 1 wherein the knob is affixed to one end of a tension rod that extends through the piston and wherein the other end of the tension rod includes an engaging member.

4. The joint of claim 3 wherein the piston further comprises:
   a first joint abutting end, and
   a second end forming a bearing surface.

5. The joint of claim 4 wherein the means for actuating comprises:
   a wedge slideably mounted in the second member and having:
      a bearing surface engagingly contacting the second end of the piston, and
      a face opposite the bearing surface and including a spring-abutting bearing surface;
   a leaf spring mounted between the wedge and the engaging member of the tension rod, said leaf spring having an angled bearing surface for engaging the spring abutting bearing surface of the wedge; and
   means for sliding the wedge to cause the wedge to exert pressure against the piston and the leaf spring;
   wherein, to interconnect the joint, the knob is engaged against one face of the first member wall and the wedge is moved, thereby exerting pressure against the piston and the leaf spring and causing the leaf spring to pull against the second, engaging end of the tension rod, and to tighten the joint because of the consequent compressive pressure of the knob and piston against opposing faces of the first member wall.

6. The joint of claim 5 wherein the means for sliding the wedge comprises an adjustment screw threadably engaged to the wedge.

7. The joint of claim 1 wherein the wall defines a chamber dimensioned to receive and hold the knob in the chamber.

8. The joint of claim 1 further comprising a flange mounted on the end of the second member to hold the piston inside the second member.

9. A structural joint comprising:
   a casing having a central axis and a joint abutting end;
   a piston mounted in the casing comprising:
      a first joint abutting end perpendicular to the central axis of the casing, and
      a second wedge-abutting end formed at a predetermined, oblique angle to the central axis of the casing;
   a tension rod comprising:
      a body having a first end and a second, engaging end, and
      a knob affixed on the first end of the body of the rod;
   a wedge slideably mounted adjacent the piston comprising:
      a bearing surface engagingly contacting the wedge-abutting end of the piston, and
      a face opposite the bearing surface and including a spring-abutting bearing surface at an angle oblique to the central axis of the casing;
   a leaf spring mounted between the wedge and the second, engaging end of the tension rod, said leaf spring having an angled bearing surface for engaging the spring-abutting bearing surface of the wedge;
   means for actuating the wedge to thereby cause the wedge to move and exert pressure against the piston and the leaf spring; and
   a receiving member having a means forming a chamber at one end for engagingly receiving the knob within the chamber;
   wherein, to interconnect the joint, the knob is inserted into the chamber and the wedge is moved, thereby exerting pressure against the piston and the leaf spring and causing the leaf spring to pull against the second, engaging end of the tension rod, and to tighten the joint because of the consequent pressure of the knob and piston against the receiving member.

10. The joint of claim 9 further comprising a first truss containing the casing and a second truss containing the receiving member.

11. The joint of claim 9 further comprising a tension spring in the chamber for engaging the knob.

12. The joint of claim 9 further comprising a flange mounted on the end of the casing and having a shoulder-abutting surface and wherein the piston further comprises a shoulder around the circumference of the first end for engagement with the shoulder-abutting surface of the flange.

13. The joint of claim 12 further comprising a compressible O-ring between the shoulder of the piston and the shoulder-abutting surface of the flange.

14. The joint of claim 9 further comprising means for causing spring tension between the tension rod and the piston.

15. The joint of claim 14 wherein the piston comprises a means forming a passage through the piston and an inside shoulder on the piston around the passage, wherein the tension rod comprises a neck forming the base of the knob and wherein the means for causing spring tension comprises a spring juxtaposed between the neck of the tension rod and the inside shoulder of the piston.

16. The joint of claim 9 further comprising an interior wall within the casing and a spring between the interior wall and the second, engaging end of the tension rod.

17. The joint of claim 9 wherein the compressive load path of the joint passes from the casing to the receiving member without passing through the tension rod.

18. The joint of claim 9 wherein the means forming the chamber includes a notched, circular retention wall forming one end of the receiving member, the notch of the retention wall being dimensioned to receive a portion of the tension rod and permit the knob to enter and remain in the chamber, and the retention wall having a first side in the interior of the receiving member for holding the knob in the chamber and a second side for contacting the first end of the piston.

19. The joint of claim 9 further comprising a means forming a passage in the wedge for slidably receiving the body of the tension rod, said passage means having a cross-sectional area sufficient to permit the wedge to slide a predetermined distance within the casing in a direction perpendicular to the central axis of the casing.

20. The joint of claim 9 wherein the means for actuating the wedge comprises an adjustment screw threadably engaged to the wedge.

21. The joint of claim 9 wherein the means for actuating the wedge comprise:
 a tightening bolt passing through the wedge and having wedge-abutting surfaces to contact and exert pressure against the wedge; and
 an actuator engagingly connected to the tightening bolt.

22. The joint of claim 21 wherein the actuator comprises—
 a cylindrical sleeve mounted around the casing;
 a first appendage on one side of the sleeve having a pair of lower inclines and a pair of upper inclines running parallel to the axis Of the casing;
 a second appendage on the other side of the sleeve having a pair of lower inclines and a pair of upper inclines running parallel to the axis of the casing;
 a first set of rollers on one end of the tightening bolt contained in the first appendage and comprising a long pair of rollers and a short pair of rollers; and
 a second set of rollers on the other end of the tightening bolt contained in the second appendage and comprising a long pair of rollers and a short pair of rollers, the axis of rotation of each of the long pair of rollers and the short pair of rollers being perpendicular;
 wherein by sliding the sleeve in a first direction along the axis of the casing, the short pair of the first set of rollers move up the lower ramps of the first appendage and the long pair of the second set of rollers move down the upper ramps of the second appendage, whereupon the sleeve stops and the tightening bolt rotates 90°, and then by sliding the sleeve in the opposite direction the long pair of the first set of rollers move up the upper ramps of the first appendage and the short pair of the second set of rollers move down the lower ramps of the second appendage, thereby causing the tightening bolt to move the wedge and tighten the joint.

23. The joint of claim 22 wherein the lower ramp in the first appendage has a steeper grade then the upper ramp in the first appendage.

24. The joint of claim 9 wherein the means for actuating the wedge comprises a tightening bolt connected to the wedge and having a dual-action pivoting actuator affixed thereto, said actuator comprising:
 a lever base having a pair of lower, inner ramps and a pair of upper, outer ramps;
 a torquing arm attached to the base; and
 a double cam having a pair of lower rollers and a pair of upper rollers, the axis of rotation of the lower rollers being offset from, and contained in a plane that is perpendicular to, the axis of rotation of the upper rollers;
 wherein by pivoting the torquing arm in a predetermined direction, the lower rollers roll up the lower ramp and at the end of the travel, the cam indexes by 90° and then by pivoting the torquing arm in the opposite direction, the upper rollers roll up the upper ramp, thereby causing the tightening bolt to move the wedge and tighten the joint.

25. A structural joint comprising:
 a first cylindrical truss having a central axis;
 a cylindrical casing formed in one end of the first truss about the central axis, said casing having a joint-abutting end and a pair of adjustment screw mounting orifices at predetermined positions on opposite sides of the wall of the casing;
 a piston in the interior of the casing comprising:
  a first end forming a flat, joint-abutting surface perpendicular to the central axis of the first truss, and
  a second end forming a flat, wedge-abutting bearing surface formed at a predetermined, oblique angle to the central axis of the truss; a tension rod comprising:
  a generally cylindrical body extending through the piston,
  a knob at one end of the body having a diameter greater than the diameter of the body of the rod, and
  an end bolt distal to said knob;
 a wedge slideably mounted in the interior of the casing and comprising:
  a first face having a flat bearing surface formed at a first angle oblique to the central axis of the first truss and engagingly contacting the wedge-abutting bearing surface of the piston, and
  a second face opposite the first face, at least a portion of the second face forming a spring-abutting bearing surface at a second angle oblique to the central axis of the first truss; a leaf spring between the wedge and the end bolt
 of the tension rod and having an angled bearing surface for engaging the spring-abutting bearing surface of the wedge;
 means for moving the wedge to cause the wedge to exert pressure against the piston and the leaf spring;
 a second cylindrical truss; and
 a cylindrical receiving member formed in the end of the second truss, said receiving member having a means forming a chamber at one end for slideably and rotatably receiving the knob;
 wherein, to interconnect the joint, the knob is inserted into the chamber and the wedge is moved by the means for moving the wedge, thereby causing the first face of the wedge to exert pressure against the second end of the piston and causing the spring-abutting bearing surface of the wedge to exert pressure against the angled bearing surface of the leaf spring and causing the leaf spring to exert pressure against the end bolt of the tension rod, and thereby to tighten the joint because of the consequent pressure of the knob and piston against the receiving member 26. The joint of claim 25 wherein the wedge further comprises means forming a passage for slidably receiving the second end of the tension rod, said passage means having a cross-sectional area sufficient to permit the wedge to slide a predetermined distance within the casing in a direction perpendicular to the central axis of the truss and means forming a bore extending through the wedge at an angle perpendicular to the central axis of the truss and concentric with the two screw mounting orifices, at least a portion of the bore means having a means for threaded engagement.

27. The joint of claim 26 wherein the means for moving the wedge comprises an adjustment screw extending from one orifice in the casing wall, through the bore means of the wedge, and out the opposing orifice in the casing wall, the adjustment screw being threadably engaged to the wedge so that by rotating the adjustment screw in a predetermined direction, the wedge is moved along a line parallel to the axis of the screw a predetermined distance and by rotating the screw the other direction, the wedge is moved along the same line in the opposite direction.

28. The joint of claim 25 wherein the chamber means further comprises a notched, circular retention wall forming one end of the receiving member, the notch of the retention wall being dimensioned to receive a portion of said tension rod and permit said knob to enter and remain in said chamber, and the retention wall having a first side in the interior of the receiving member for holding the knob in the chamber and a second side for contacting the first end of said piston.

29. The joint of claim 25 further comprising a tension spring in the chamber for engaging the knob.

30. The joint of claim 25 further comprising a flange mounted on the end of the casing and having a shoulder-abutting surface in the interior of the casing and wherein the piston further comprises a shoulder around the circumference of the first end for engagement with the shoulder-abutting surface of the flange.

31. The joint of claim 30 further comprising a compressible O-ring between the shoulder of the piston and the shoulder-abutting surface of the flange.

32. The joint of claim 25 further comprising means for causing spring tension between the tension rod and the piston.

33. The joint of claim 32 wherein the piston comprises a means forming a passage through the piston and an inside shoulder in the piston around the passage, wherein the tension rod comprises a neck forming the base of the knob and wherein the means for causing spring tension comprises a spring juxtaposed between the neck of the tension rod and the inside shoulder of the piston.

34. The joint of claim 25 further comprising an interior wall within the casing and a spring juxtaposed between the interior wall and the end bolt.

35. The joint of claim 25 wherein the compressive load path of the joint passes from the casing to the receiving member without passing through the tension rod.

36. The joint of claim 25 wherein the means for moving the wedge comprises an adjustment screw threadably engaged to the wedge.

37. The joint of claim 25 wherein the means for moving the wedge comprises:
 a tightening bolt passing through the wedge and having wedge-abutting surfaces to contact and exert pressure against the wedge; and
 an actuator engagingly connected to the tightening bolt.

38. The joint of claim 37 wherein the actuator comprises:
 a cylindrical sleeve mounted around the casing;
 a first appendage on one side of the sleeve having a pair of lower inclines and a pair of upper inclines running parallel to the axis of the casing;
 a second appendage on the other side of the sleeve having a pair of lower inclines and a pair of upper inclines running parallel to the axis of the casing;
 a first set of rollers on one end of the tightening bolt contained in the first appendage and comprising a long pair of rollers and a short pair of rollers; and
 a second set of rollers on the other end of the tightening bolt contained in the second appendage and comprising a long pair of rollers and a short pair of rollers, the axis of rotation of each of the long pair of rollers and the short pair of rollers being perpendicular;
 wherein by sliding the sleeve in a first direction along the axis of the casing, the short pair of the first set of rollers move up the lower ramps of the first appendage and the long pair of the second set of rollers move down the upper ramps of the second appendage, whereupon the sleeve stops and the tightening bolt rotates 90°, and then by sliding the sleeve in the opposite direction the long pair of the first set of rollers move up the upper ramps of the first appendage and the short pair of the second set of rollers move down the lower ramps of the second appendage, thereby causing the tightening bolt to move the wedge and tighten the joint.

39. The joint of claim 38 wherein the lower ramp in the first appendage has a steeper grade then the upper ramp in the first appendage.

40. The joint of claim 25 wherein the means for moving the wedge comprises a tightening bolt connected to the wedge and having a dual-action pivoting actuator affixed thereto, said actuator comprising:
 a lever base having a pair of lower, inner ramps and a pair of upper, outer ramps;
 a torquing arm attached to the base; and
 a double cam having a pair of lower rollers and a pair of upper rollers, the axis of rotation of the lower rollers being offset from, and contained in a plane that is perpendicular to, the axis of rotation of the upper rollers;
 wherein by pivoting the torquing arm in a predetermined direction, the lower rollers roll up the lower ramp and at the end of the travel, the cam indexes by 90° and then by pivoting the torquing arm in the opposite direction, the upper rollers roll up the upper ramp, thereby causing the tightening bolt to move the wedge and tighten the joint.

41. A joint for joining first and second members comprising:
 a wall carried by the first member;

a piston carried by the second member and having a wall-abutting face and a shoulder;

a flange mounted to the second member and having a shoulder-abutting surface; and means for applying a preload between the wall an the wall-abutting face of the piston and between the shoulder of the piston and the shoulder-abutting surface of the flange.

42. The joint of claim 41 wherein the means for applying a preload comprises:

a knob carried by the second member and engageable against the wall;

a wedge slideably mounted in the second member and having a bearing surface engagingly contacting the piston and a spring abutting face opposite the bearing surface;

a tension rod connected to the knob;

a leaf spring attached to the tension rod and held against the spring abutting face of the wedge; and means for causing the wedge to exert pressure against the piston and leaf spring and thereby establishing the preload.

* * * * *